No. 857,737. PATENTED JUNE 25, 1907.
H. J. HURD.
MACHINE FOR MOLDING CEMENT BRICKS, BLOCKS, AND THE LIKE.
APPLICATION FILED SEPT. 24, 1906.
2 SHEETS—SHEET 1.
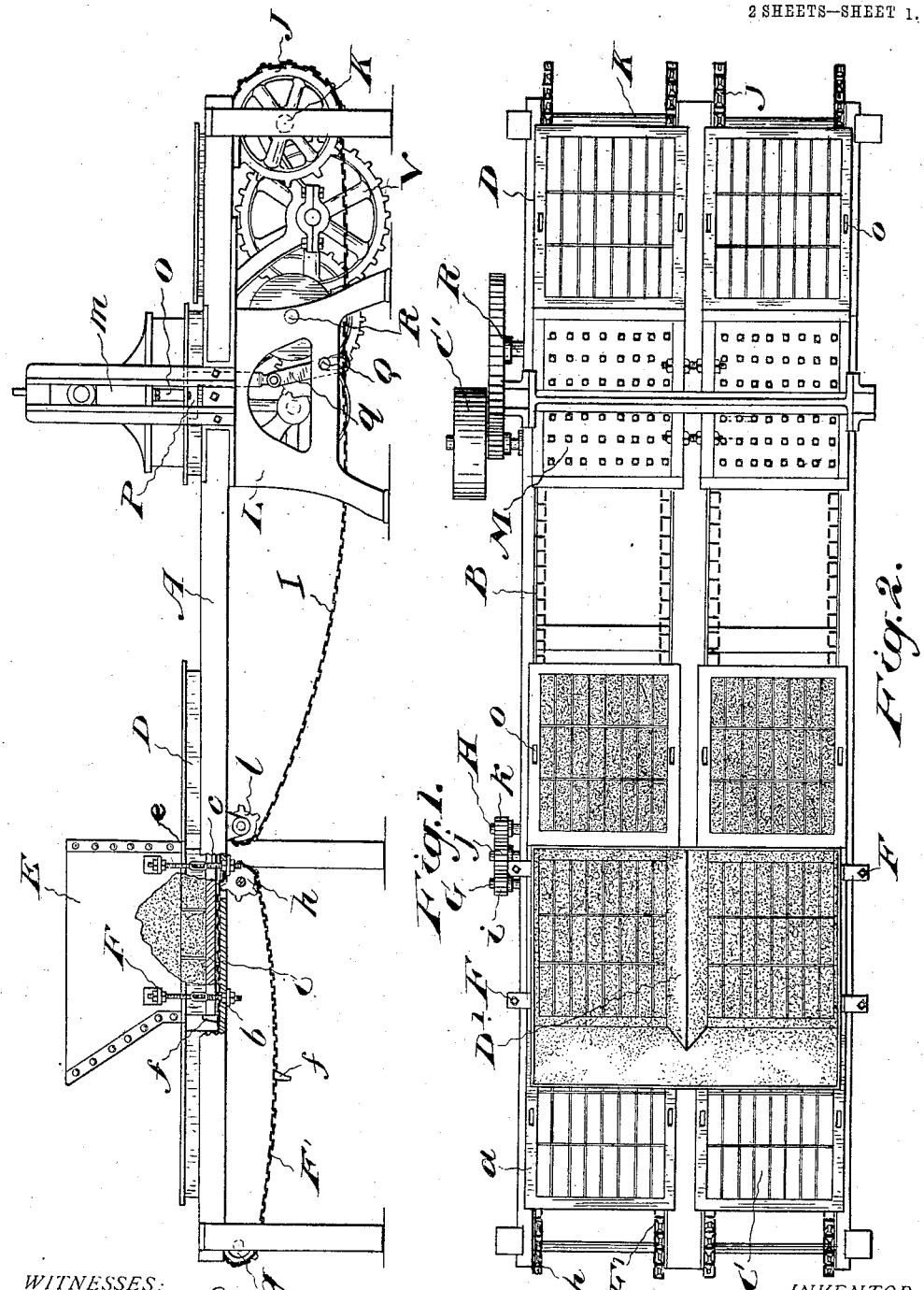
WITNESSES:
INVENTOR.
Herbert J. Hurd
BY
Ridout & Maybee
ATTORNEYS.

No. 857,737. PATENTED JUNE 25, 1907.
H. J. HURD.
MACHINE FOR MOLDING CEMENT BRICKS, BLOCKS, AND THE LIKE.
APPLICATION FILED SEPT. 24, 1906.

2 SHEETS—SHEET 2.

WITNESSES:

INVENTOR.
Herbert J. Hurd
BY Ridout & Maybee
ATTORNEYS.

UNITED STATES PATENT OFFICE.

HERBERT JAS. HURD, OF BERLIN, ONTARIO, CANADA.

MACHINE FOR MOLDING CEMENT BRICKS, BLOCKS, AND THE LIKE.

No. 857,737.      Specification of Letters Patent.      Patented June 25, 1907.

Application filed September 24, 1906. Serial No. 335,896.

*To all whom it may concern:*

Be it known that I, HERBERT JAMES HURD, of the town of Berlin, in the Province of Ontario, Canada, have invented certain new and useful Improvements in Machines for Molding Cement Bricks, Blocks, and the Like, of which the following is a specification.

My object is to devise a machine for molding and pressing cement bricks or blocks of any desired size which will be entirely automatic in its action, requiring hand labor only in the handling of the molds and pallets and removal of the finished product, and my invention consists essentially of a hopper, a mold, a conveyer adapted to draw the mold beneath the hopper whereby it is filled, a press, a conveyer of twice the speed of the first conveyer adapted to draw the filled mold to the press, means for operating the press, means for lifting the mold vertically away from the pressed blocks, means for subsequently raising the plunger of the press, means for moving away the finished blocks, means for dropping the empty mold and for moving it away to leave room for a full mold to be brought under the press, means being provided for imparting and co-ordinating the said movements, substantially as hereinafter more specifically described, and then definitely claimed.

Figure 3:
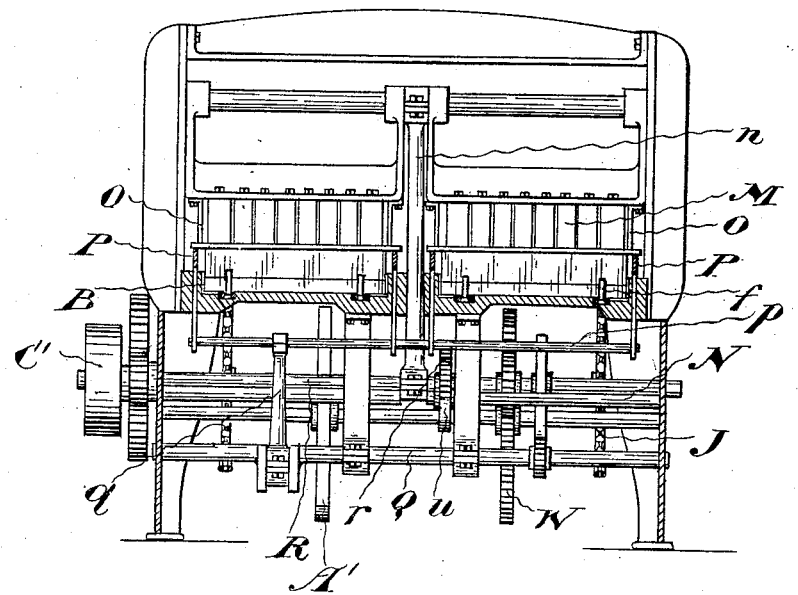
Figure 4:
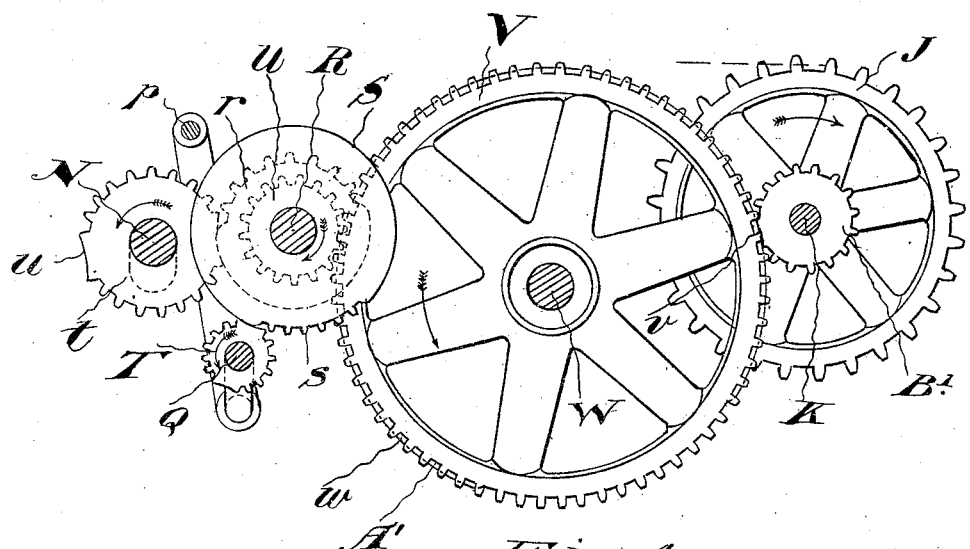

Figure 1 is a side elevation of my machine. Fig. 2 is a plan view of the same. Fig. 3 is a cross sectional view partly in elevation. Fig. 4 is a detail of the gearing in side elevation.

In the drawings like letters of reference indicate corresponding parts in the different figures.

A is the frame of the machine suitably shaped to support the different parts. The top member of the frame has guideways B formed therein, on which the molds are movable. These molds each comprise a bottom or pallet C and a mold frame D. These molds may be of any shape or size, and may be either simple or compound. In the drawings I show each mold provided with thin partitions to form a compound mold for the molding of the material in brick size. Each mold, it will be seen, is provided with an outwardly extending flange $a$.

Over the top of the frame of the machine, toward one end, is supported a hopper E, of any convenient size and shape. The hopper is preferably connected with the frame of the machine by right and left hand threaded screws F, which engage suitably threaded lugs $b$ and $c$, connected respectively to the hopper sides and the frame of the machine. By means of these screws the hopper may be vertically adjusted to the height of the molds, which are filled by being drawn beneath the hopper, the vertical front edge $e$ of the hopper serving as a scraper to level off the contents of the molds. The molds are drawn beneath the hopper by means of an endless conveyer F', the links of which are provided at suitable intervals with lugs $f$ adapted to engage the rear sides of the molds. This conveyer is carried on the sprocket wheels $g$ and $h$. The latter are secured to a shaft G suitably journaled on the frame of the machine. On one end of the shaft is a gear wheel $i$ meshing with an intermediate gear wheel $j$, meshing with the gear wheel $k$, fast on the shaft H, journaled on the frame of the machine. The gear wheels $i$, $j$ and $k$ are so proportioned that the shaft H will run at twice the speed of the shaft G. On the shaft H are secured the sprocket wheels $l$, which run the conveyer I, the other end of which is carried on the sprocket wheels J, fast on the shaft K at the front of the machine. This shaft is driven, as hereinafter described, to impart motion to the conveyers.

Toward the right hand side of the machine is located a press, of which L is the bed and M the plunger. The plunger is vertically movable in the guides $m$. Motion is imparted to the plunger by means of the crank shaft N, the crank of which is connected with the plunger by a suitably connecting rod $n$. This crank shaft is operated as hereinafter described. The plunger is shown as compound to engage each one of the divisions of the mold frames shown.

The two conveyers are so located relative to the hopper that each mold is slowly conveyed beneath the hopper until it is filled. It is then seized by the second conveyer, which is of similar construction to the first, and at twice its former speed is moved on to the press. As soon as it arrives beneath the press the plunger is caused to descend, as hereinafter described, and the material in the molds is powerfully compressed.

As it is necessary, particularly when employing compound molds and plungers, that the mold frames should be accurately centered beneath the plunger, I provide at each side of the plunger a downwardly projecting arm O. The flanges of the molds are provided with holes o which these arms are adapted to enter as the plunger descends. The ends of the arms O are tapered so that if a mold frame is not exactly centered the arms will still be able to enter the holes o, and as they descend draw the mold frames into the proper central position. It is essential, of course, that the arms project sufficiently far to aline the mold frames before the plungers enter them.

At each side of the press are located two lifter arms P, sliding vertically through suitable guideways formed in the bed of the press. These arms are preferably L-shaped to provide a broad bearing for engagement with the flanges a of the molds. These lifters are connected by the rod p, and this rod is connected by a pitman q with the crank on the crank shaft Q, operated as hereinafter described.

The movements of the apparatus are as follows:—The filled molds are brought from the hopper to the press by the conveyer I. As soon as a mold arrives beneath the plunger of the press the latter is caused to descend and the plastic material within the mold is suitably compressed. While the plunger is still in engagement with the pressed article or articles the lifters are caused to push up the mold frame until it is clear of the upper surface of the pressed article. The plunger then commences to rise, and as soon as it has lifted clear of the pressed articles the conveyer I, which has been stopped as soon as the mold had been brought to the press, is re-started and the mold bottom C with the pressed articles thereon is drawn out from the press, and is then removed by hand for setting and drying. As soon as the mold bottom is clear of the press the lifter arms are drawn down, thus allowing the mold frame to drop upon the conveyer I, which engages it and draws it out of the press. It will be noted that it is this separate drawing of the mold bottom with the pressed articles, and the mold frame itself, from the press which necessitates the conveyer I operating at double the speed of the conveyer F', as it is necessary that these two operations be performed in the same time which is occupied in the filling of the molds, and it is extremely undesirable that the operation of filling be performed too rapidly.

I will now describe the mechanism employed for imparting the various movements to the different parts.

Referring particularly to Fig. 4, R is the main driving shaft. On this shaft is secured a segment gear r. That portion of the gear which is not toothed has a smooth periphery s struck with the radius of the pitch line of the gear teeth. This segment gear r is adapted to mesh with the segment gear t, fast on the crank shaft N of the press. On this segment gear t, it will be seen that there are two gear segments separated from one another by non-toothed portions u, each having its periphery concave to engage the smooth portions s of the periphery of the segment gear r. From this construction it follows that the crank shaft N will be rotated every time the teeth of the segment gear r are in mesh with the teeth of the segment gear t, and that it will be held stationary while the periphery s of the segment gear r is engaged with the non-toothed portions u of the segment gear t. Thus one rotation of the driving shaft gives two half revolutions of the crank shaft, with a dwell between each half revolution. On the shaft R is also secured a segment gear S, which is adapted to mesh with segment gear T, fast on the crank shaft Q. It will be noted that these two segment gears are similar in construction to the segment gears r and t. They are, however, necessarily proportioned to give the rapid raising and lowering of the lifter arms P at the time and for the purpose hereinbefore set forth. On the main driving shaft R is also secured a gear pinion U meshing with the gear wheel V, secured to the shaft W, journaled on the frame of the machine. On the shaft W is also secured a segment gear A', meshing with the segment gear B', fast on the shaft K, carrying the sprocket wheels J of the conveyer I. These two gear segments are similar in construction to those already described, but it will be noted that the segment gear B' is provided with only one non-toothed concave portion v, so that the conveyers are continuously in motion, except when the smooth periphery w on the segment gear A' is in contact with the part v, thus affording the dwell in the action of the conveyer which takes place while the plunger of the press is descending.

The main driving shaft is of course provided with a suitable driving pulley O'.

It will be noted that though I have described the apparatus as single, yet in the drawings it is shown as double, that is to say, the conveyers F and I, the guides m, the lifter arms P and the plunger M are shown duplicated laterally. The hopper E is also shown divided into two parts by the longitudinal wedge shaped partition D'. A single crank and connecting rod n is shown for both plungers; also a single crank shaft Q and connecting rod p for the lifter arms P.

The shafts of the apparatus do not require to be duplicated but extend from side to side of the double machine as shown, the gear wheels and gear segments being located thereon in the most convenient positions.

While the gearing I have described answers the purpose of my invention admirably, it will be understood, of course, that I do not desire to restrict myself absolutely to its use, as other gearings may be devised to answer the purpose.

What I claim as my invention is:

1. In a molding machine the combination of a main frame having a guideway formed thereon; a hopper supported above it; molds adapted to slide on the guideway beneath the hopper; a conveyer adapted to move the molds; a press adapted to press the articles in the molds; a conveyer traveling at twice the speed of the first conveyer, adapted to convey the filled molds through the press; means for lifting the molds away from the pressed articles while the latter are carried forward by the conveyer, and for subsequently dropping the mold on the conveyer; and means for driving the various parts whereby the conveyers are stationary while the press is in contact with the molded articles, substantially as described.

2. In a molding machine the combination of a main frame having a guideway formed thereon; a hopper supported above it; molds adapted to slide on the guideway beneath the hopper; a conveyer adapted to move the molds; a press adapted to press the articles in the molds; a conveyer traveling at twice the speed of the first conveyer, adapted to convey the filled molds through the press; means for separating the molds and the pressed articles and replacing the former on the conveyer in a different position; and means for driving the various parts whereby the conveyers are stationary while the press is in contact with the molded articles, substantially as described.

3. In a molding machine the combination of a main frame having a guideway formed thereon; a hopper supported above it; mold bottoms adapted to slide on the guideway beneath the hopper; mold frames adapted to rest on said bottoms; a conveyer adapted to move the mold bottoms and frames beneath the hopper; a press adapted to press the articles in the molds; a conveyer adapted to convey the filled molds from the hopper through the press; means for raising the mold frames when the molds are in the press; and means for operating the conveyers, the mold frame lifter and the press, said means being arranged to drive the second conveyer at twice the speed of the first conveyer, to stop the conveyers while the press is operating in the molds, to raise the mold frame lifter before the press has disengaged, and to drop the lifter after the second conveyer has moved forward at least the length of a mold, substantially as described.

4. In a molding machine the combination of a main frame having a guideway formed thereon; molds adapted to slide on the guideway; means for filling the molds; a press adapted to press the articles in the molds; a conveyer adapted to convey the filled molds through the press; means for lifting the molds away from the pressed articles while the latter are carried forward by the conveyer, and for subsequently dropping the mold on the conveyer; and means for driving the various parts whereby the conveyer is stationary while the press is in contact with the molded articles, substantially as described.

5. In a molding machine the combination of a main frame having a guideway formed thereon; molds adapted to slide on the guideway; means for filling the molds; a press adapted to press the articles in the molds; a conveyer adapted to convey the filled molds through the press; means for separating the molds and the pressed articles and replacing the former on the conveyer in a different position; and means for driving the various parts whereby the conveyer is stationary while the press is in contact with the molded articles, substantially as described.

6. In a molding machine the combination of a main frame having a guideway formed thereon; mold bottoms adapted to slide on the guideway; mold frames adapted to rest on the said bottoms; means for filling the molds; a press adapted to press the articles in the molds; a conveyer adapted to convey the filled molds through the press; means for raising the mold frames when the molds are in the press; and means for operating the conveyer, the mold frame lifter and the press, said means being arranged to stop the conveyer while the press is operating in the molds to raise the mold frame lifter before the press has disengaged, and to drop the lifter after the conveyer has moved forward at least the length of a mold, substantially as described.

Berlin, Ont., 13th September, 1906.

HERBERT JAS. HURD.

Signed in the presence of—
R. B. JOHNSON,
DONALD McDONALD.